United States Patent
Neufang

(10) Patent No.: US 8,545,101 B2
(45) Date of Patent: Oct. 1, 2013

(54) LINEAR GUIDE UNIT

(75) Inventor: Lothar Neufang, Homburg/Saar (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 430 days.

(21) Appl. No.: 12/516,106

(22) PCT Filed: Nov. 20, 2007

(86) PCT No.: PCT/EP2007/062546
§ 371 (c)(1),
(2), (4) Date: Jul. 20, 2009

(87) PCT Pub. No.: WO2008/061971
PCT Pub. Date: May 29, 2008

(65) Prior Publication Data
US 2009/0324146 A1    Dec. 31, 2009

(30) Foreign Application Priority Data
Nov. 23, 2006   (DE) .......................... 10 2006 055 196

(51) Int. Cl.
*F16C 29/06*    (2006.01)
*F16C 33/10*    (2006.01)

(52) U.S. Cl.
USPC .............................................. 384/13; 384/43

(58) Field of Classification Search
USPC ......................................... 384/13, 43, 44, 45
See application file for complete search history.

(56) References Cited

U.S. PATENT DOCUMENTS

| | | | |
|---|---|---|---|
| 3,116,747 A * | 1/1964 | Cowles et al. | 137/68.23 |
| 4,925,323 A * | 5/1990 | Lederman | 384/607 |
| 6,203,199 B1 | 3/2001 | Pfeuffer | |
| 2005/0173195 A1 | 8/2005 | Anita et al. | |
| 2006/0177163 A1 * | 8/2006 | Neufang et al. | 384/45 |

FOREIGN PATENT DOCUMENTS

| | | | |
|---|---|---|---|
| DE | 41 41 038 | | 6/1993 |
| DE | 4210299 A1 | | 9/1993 |
| DE | 4331013 A1 * | | 2/1995 |
| DE | 44 12 797 X | | 10/1995 |
| DE | 100 26 587 A | | 12/2000 |
| DE | 103 32 922 A | | 2/2005 |
| DE | 102004043749 A1 | | 3/2006 |
| EP | 08 63 343 | | 9/1998 |
| EP | 0971140 A1 | | 1/2000 |
| JP | 48-143175 | | 12/1973 |
| JP | 50-086735 | | 7/1975 |
| JP | 04-034947 | | 5/1990 |
| JP | 05-094588 | | 6/1991 |
| JP | 2000035040 | | 2/2000 |
| WO | WO 9411644 A1 * | | 5/1994 |

* cited by examiner

*Primary Examiner* — Phillip A Johnson
(74) *Attorney, Agent, or Firm* — Lucas & Mercanti, LLP

(57) ABSTRACT

A linear guide unit, with a guide carriage arranged on a guide rail and rolling bodies which circulate in circulating channels. Each circulating channel has a load section, a return section and two deflection sections endlessly connecting the load section to the return section. The load section is delimited by running tracks for the rolling bodies, which are formed on the guide carriage and guide rail, and with lubricant channels which are formed on the guide carriage and are connected to the circulating channels. An end is connected to a transfer point to a further lubricant channel or the circulating channel. A seal with an annularly closed sealing section is provided between the end of the lubricant channel and the transfer point, and is designed as a valve which prevents the lubricant channel from running at no-load.

14 Claims, 3 Drawing Sheets

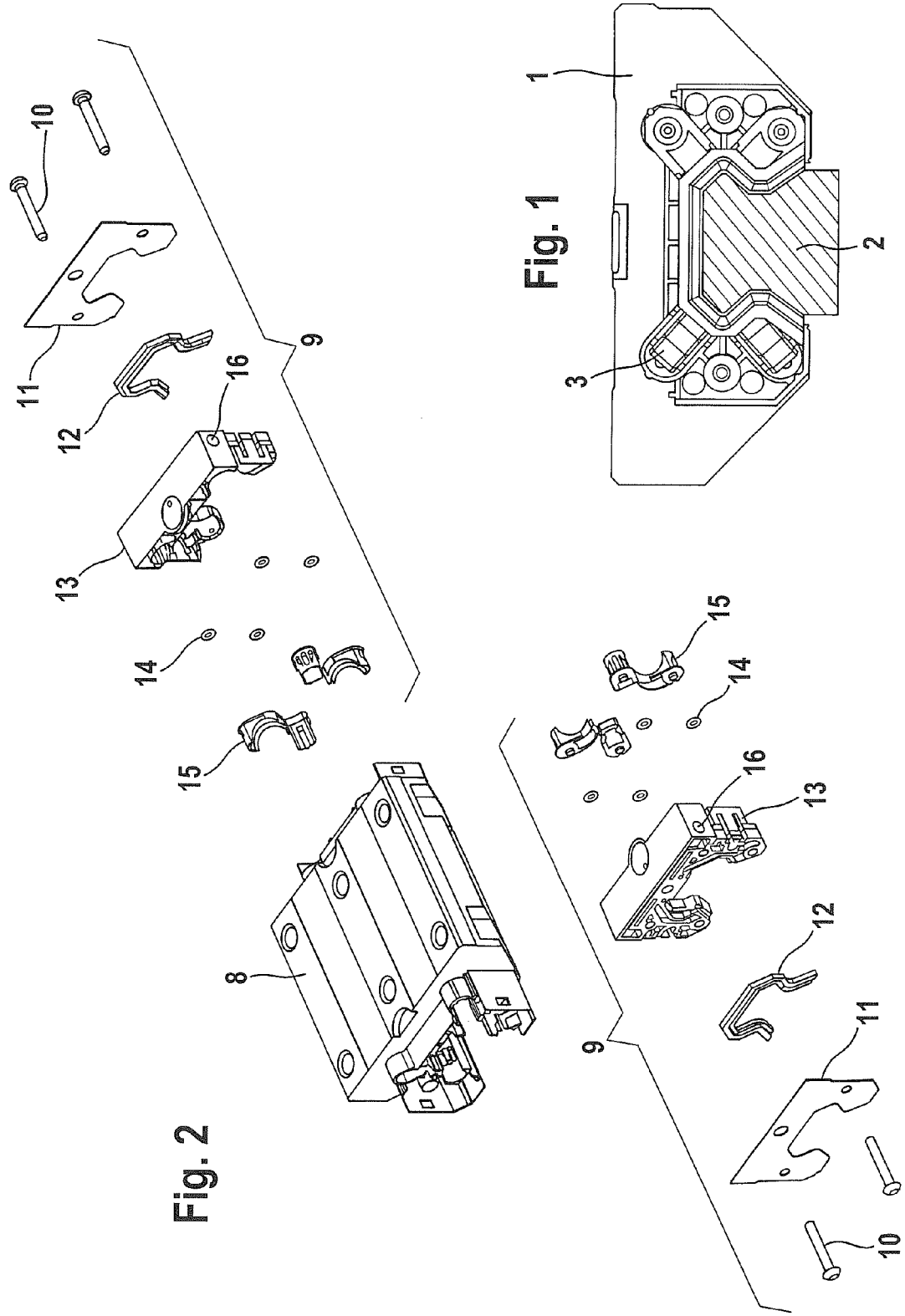

LINEAR GUIDE UNIT

This application is a 371 of PCT/EP2007/062546 filed Nov. 20, 2007, which in turn claims the priority of DE 10 2006 055 196.6 filed Nov. 23, 2006, the priority of both applications is hereby claimed and both applications are incorporated by reference herein.

BACKGROUND OF THE INVENTION

The present invention relates to a linear guide unit, in which a guide carriage is arranged on a guide rail.

DE 100 26 587 A1, for example, discloses a linear movement apparatus. In particular, it can be gathered from FIG. 7 of DE 100 26 587 A1 that, in the case of the end sealing element 30, a transfer point is provided between the end plate 20 and a sealing element 32, at which transfer point an O-ring seals a lubricant channel with respect to the surroundings, said O-ring bearing sealingly on one side against the end plate 20 and on the other side against the sealing element 32. In this known linear guide unit, a storage unit 28 is connected to the lubricant channel, from which storage unit 28 lubricant runs, on account of capillary force, through lubricant feed holes 32b to an application element 31.

It may be expedient in certain cases to design lubricant channels of this type in such a way that it is prevented that lubricant returns in an undesired manner or the lubricant channel runs dry. From DE 103 32 922 A1, for example, a valve 30, which allows the lubricant through only in one flowing direction, is provided for this purpose.

SUMMARY OF THE INVENTION

It was an object of the present invention to specify a linear guide unit, in which a transfer point in the lubricant channel is sealed satisfactorily in a simple way, it additionally being prevented in a simple way that the lubricant channel runs dry in an undesired manner.

According to the invention, this object is achieved by the fact that the seal is formed within the, in particular, annularly closed sealing section as a valve which prevents the lubricant channel from running dry. For instance, a sealing ring having the contour of a commercially available O-ring can be used in a simple way, it being possible for a plane or a conical wall to be formed within the annularly closed sealing section, it being possible for said wall to be provided with one or more slots, with the result that, in the case of pressure loading from one side, the slot opens and, in the case of pressure loading from the other side, slot walls are pressed against one another and the slots close, with the result that no lubricant can flow back. Pressure loading can be carried out, for example, for the purpose of relubrication. The valve remains closed without pressure loading; that is to say, the lubricant channel cannot run dry.

Instead of a sealing ring with an annular sealing section, the seal can also have a different design; for instance, a polygonal profile can be used, for example a rectangular or square seal, a sealing section being formed which is closed in a rectangular or square manner.

Seals or sealing rings of this type with the valve which is combined according to the invention can preferably be formed using the injection molding process from an elastomeric or thermoplastic material. It has been proven that, in particular, a thermoplastic polyester elastomer is advantageous as thermoplastic, for example Hytrel 5555. In a thermoplastic polyester elastomer of this type, the slots can be allowed for as early as in the die in the injection molding process. However, other thermoplastics or elastomers are also suitable for the invention, if slots open in their valve function in the case of pressure loading from one direction. Depending on the material which is used, the slot can be provided as early as in the die in the injection molding process. However, it is also possible that the slot is, for example, cut into the wall following the injection molding process.

One variant according to the invention which is particularly advantageous in economic terms provides for the sealing ring to be formed from a material which can be injection molded, the valve which is formed as a wall which is, in particular, planar or conical being connected integrally to the annularly closed sealing section of the sealing ring. Here, the outer circumference of the wall preferably merges into the annularly closed sealing section. Accordingly, in the case of a conical wall, the end which faces away from the cone tip merges into the annularly closed sealing section.

In the case of a conical wall, a valve opening can be of elastically closable design at the cone tip, said valve opening opening elastically under pressure loading in the direction of the circulatory channel for the rolling bodies. In this exemplary embodiment, the wall tightens at the cone tip to such an extent that the inner wall can be seen only as a line, with the result that no more lubricant can flow. On account of the conical design of the wall, in the case of an excess pressure from the side of the circulatory channel, the pressure would be exerted on said cone tip in such a way that the closing effect of the valve increases even further. Only in the case of pressure loading in the opposite direction from the cone base in the direction of the cone tip, the cone wall would be widened from the inside, with the result that the inner side at the cone tip delimits a valve opening, through which lubricant can then flow.

It has been proven that even simple slots in the planar or conical wall are sufficient to obtain the desired valve function. Said slots can be formed simply, but a plurality of slots which are arranged, in particular, crosswise and penetrate which the wall, can also be provided, the slot walls bearing elastically against one another and closing slot openings elastically, which open under pressure loading in the direction of the circulatory channel. In the case of slots which are arranged crosswise, the crossing point is preferably aligned with the cone tip.

A further particular advantage of the invention can be seen in the fact that, in the case of running series of linear guide units, the valve function can be provided additionally, without particular modifications to the linear guide unit being required: this is because O-rings which are intended to seal the lubricant channel to the outside are often used in linear guide units of this type. Said O-rings only have to be replaced by the sealing rings which are provided according to the invention, in order to achieve the desired sealing action on the one hand and to achieve the valve action according to the invention to prevent the lubricant channel from running dry on the other.

There is provision in a further exemplary embodiment for the guide carriage to have a supporting body and end pieces which adjoin the end sides of the supporting body, the deflection sections being arranged in the end pieces, and each deflection section having an inner deflection means and an outer deflection means, rolling bodies being deflected between the inner deflection means and the outer deflection means, and the outer deflection means being formed on a deflection shell which is provided with the transfer point. Said transfer point can be provided, for example, with a tubular thin-walled connection piece which is provided with a through opening for lubricant. The seal which is configured, in particular, as a sealing ring can be applied onto said connection piece, the valve closing the through opening to prevent the lubricant channel from running dry.

However, it is likewise possible to configure the transfer point as a cylindrical recess, in which the sealing ring according to the invention is arranged, a through opening for lubricant being formed centrally with respect to the cylindrical recess.

BRIEF DESCRIPTION OF THE DRAWINGS

In the following text, the invention will be explained in greater detail using three exemplary embodiments which are depicted in a total of eight figures, in which:

FIG. 1 shows a linear guide unit according to the invention in cross section;

FIG. 2 shows the guide carriage of the linear guide unit according to the invention in an exploded illustration;

DETAILED DESCRIPTION OF THE INVENTION

Figure 3:
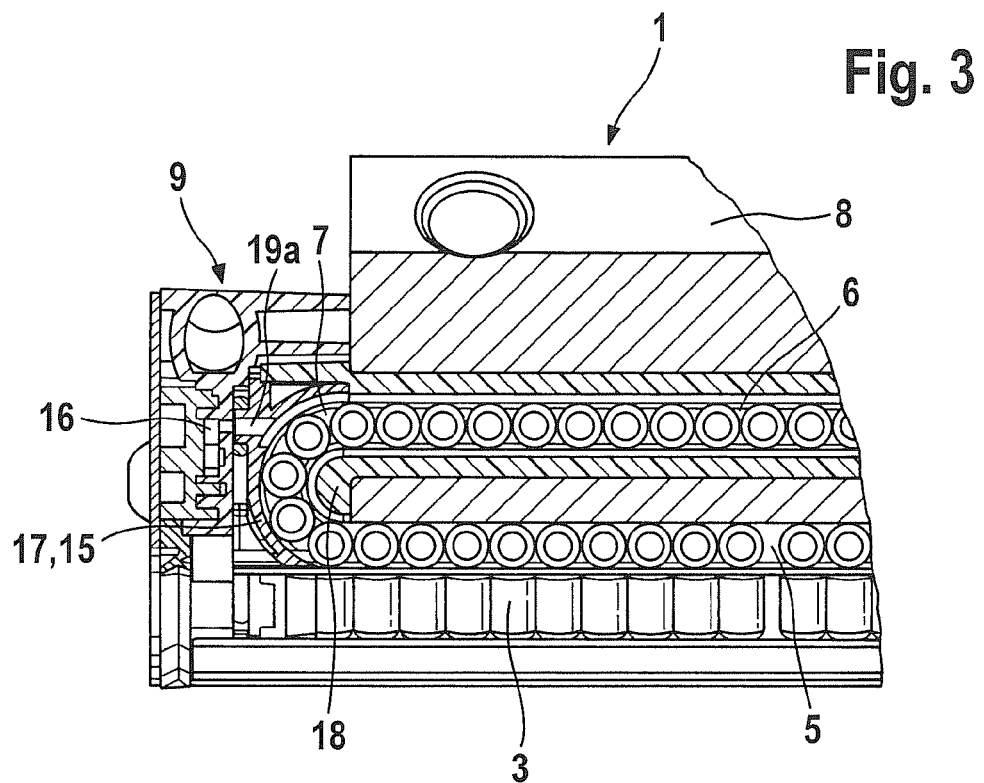
FIG. 3 shows a partial longitudinal section through the guide carriage of the linear guide unit according to the invention.

FIG. 1 shows a linear guide unit according to the invention in cross section. A guide carriage 1 is roller mounted longitudinally displaceable on a guide rail 2 via rollers 3 which are provided as rolling bodies. The rollers 3 circulate in endless circulatory channels 4, FIG. 3 showing a circulatory channel 4 of this type in a partial longitudinal section. The circulatory channel 4 has a loadbearing section 5, a return section 6, and two deflection sections 7 which connect the return section 6 to the loadbearing section 5 endlessly.

FIG. 2 shows the guide carriage 1 in an exploded illustration, but without the rollers. It can be gathered from this depiction that the guide carriage 1 has a supporting body 8 and end pieces 9 which are attached on the end side to the supporting body 8. The two end pieces 9 are composed from a multiplicity of individual parts: fastening screws 10, cover plate 11, stripper 12, cap 13, sealing rings 14, deflection shells 15.

The fastening screws 10 serve to fasten the end piece 9 to the supporting body 8. The stripper 12 serves to strip dirt from the guide rail 2 when the guide carriage 1 is moved along the guide rail 2. The cap 13 on the one hand receives the deflection shells 15; on the other hand, lubricant channels 16 are provided on the cap 13.

It can be gathered clearly from FIG. 3 that the deflection shell 15 forms an outer deflection means 17 for the rollers 3, the rollers 3 being deflected between the outer deflection means 17 and the inner deflection means 18. In FIG. 3, likewise in section, the lubricant channels 16 are depicted at least partially. Lubricant which is introduced from the outside via the lubricant channels in the direction of the circulatory channels 4 for lubricating the rolling body circulation is introduced via the lubricant channels 16 and a through opening 19a which is attached to the deflection shell 15 in the region of the circulatory channel 4.

Figure 4:
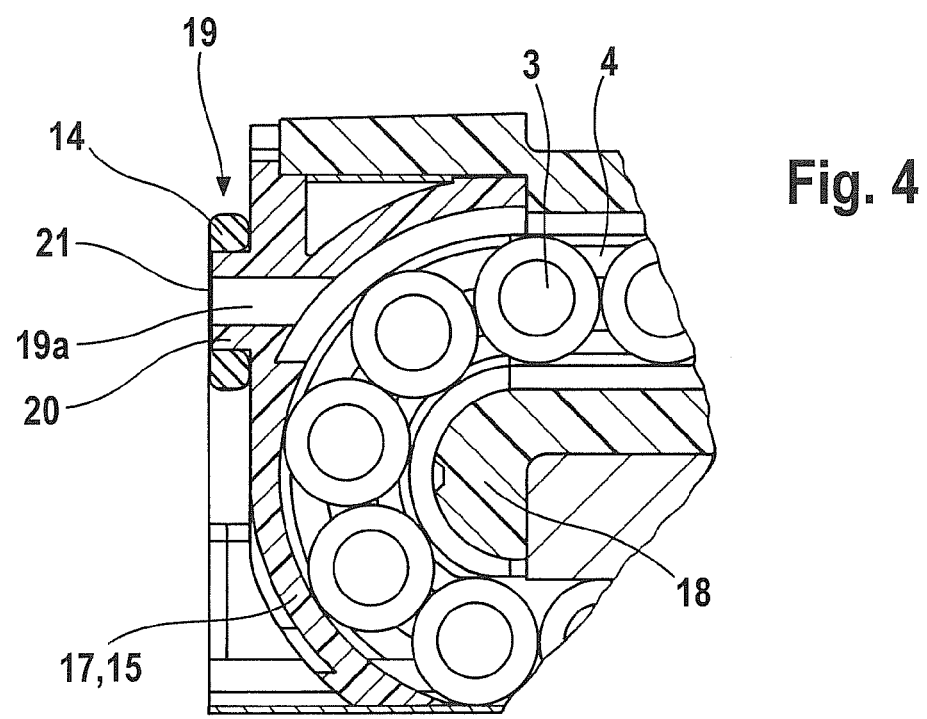
FIG. 4 shows an enlargement of a detail from FIG. 3.

FIG. 4 is an enlargement of a detail of FIG. 3. It can be seen clearly in said Figure that the deflection shell 15 is provided with a transfer point 19, to which the lubricant channel 16 is connected. The sealing ring 14 seals the lubricant channel 16 and the through opening 19a to the outside, with the result that no lubricant can escape in the contact region between the cap 13 and the deflection shell 15.

The deflection shell 15 has a tubular thin-walled connection piece 20, onto which the sealing ring 14 is placed. When the guide carriage 1 is completely mounted, the sealing ring 14 is clamped between the deflection shell 15 and the cap 13. It can further be gathered from FIG. 4 that a valve 21, which prevents the lubricant channel 16 from running dry, is formed on the sealing ring 14. The construction and method of operation of the valve 21 and further valves will be explained in greater detail further below.

Figure 5:
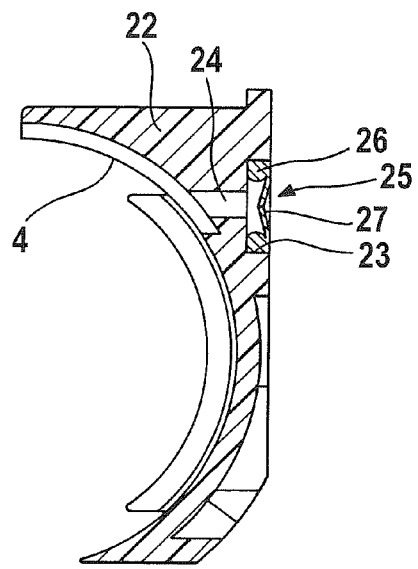
FIG. 5 shows a detail of the guide carriage according to FIG. 3.

FIG. 5 shows a deflection shell 22 which is modified in comparison with FIG. 4. Said deflection shell differs from that from FIG. 4 substantially in that, instead of the tubular connection piece, a cylindrical recess 23 is formed, to which a through opening 24 to the circulatory channel 4 is connected centrally, with the result that lubricant passes out of the lubricant channel 16 via a transfer point 25 through the through opening 24 as far as the circulatory channel 4. A sealing ring 26 is inserted into the cylindrical recess 23, which sealing ring 26 is likewise clamped between the deflection shell 22 and the cap 13, like in the above-described exemplary embodiment, with the result that no lubricant can escape to the outside as leakage. The sealing ring 26 is likewise provided with a valve 27 which prevents lubricant running out of the circulatory channel 4 through the through opening back into the lubricant channel 16. Furthermore, the valve 27 prevents the lubricant channel running dry.

Figures 6, 7, 8:
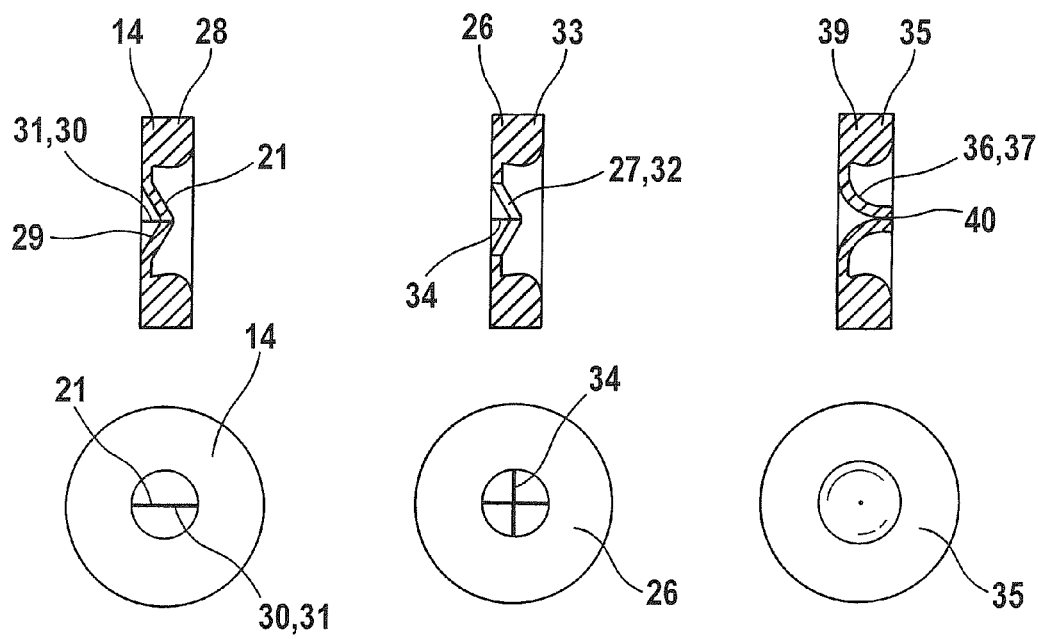
FIGS. 6 to 8 show three variants according to the invention of a sealing ring of the linear guide unit according to the invention.

In a cross section and in an elevation, FIG. 6 shows the sealing ring 14 from the first exemplary embodiment with the valve 21. It can be gathered from the two illustrations in FIG. 6 that the sealing ring has an annularly closed sealing section 28 and a conical wall 29 which adjoins said sealing section 28 integrally. Said conical wall 29 is provided with a slot 30 which penetrates said wall 29. This mounted sealing ring 14 is inserted in such a way that the cone tip is oriented in the direction of the circulatory channel 4. In the case of pressure loading from the side of the lubricant channel 16, the conical wall 29 is widened, the slot 30 being opened to such an extent that lubricant can pass through. In the case of pressure loading in the opposite direction, the prevailing pressure would merely bring it about that slot walls 31 which delimit the slot are pressed yet further against each other, with the result that no lubricant can run back.

FIG. 7 shows the sealing ring 26 which is used in FIG. 5, with the integrally formed valve 27. Just like in the above-described sealing ring, a conical wall 32 also adjoins an annular sealing section 33 here, said wall 32 likewise being slotted. In a deviation from the previously described exemplary embodiment, two slots 34 which are arranged crosswise are provided here, however.

FIG. 8 shows a further exemplary embodiment of a sealing ring 35, in which likewise a conical wall 36 forms a valve 37, the wall 36 adjoining an annularly closed sealing section 39 integrally with its end which faces away from the cone tip. In this sealing ring 35, a valve opening 40 is provided which is delimited by the inner side of the wall 36, said valve opening 40 being closed by elastic contraction of the wall 36. Under pressure loading from the side of the lubricant channel 16, the wall 36 is widened elastically, with the result that the valve opening 40 is released for the passage of lubricant.

LIST OF DESIGNATIONS

1 Guide carriage
2 Guide rail

3 Roller
4 Circulatory channel
5 Loadbearing section
6 Return section
7 Deflection section
8 Supporting body
9 End piece
10 Fastening screw
11 Cover plate
12 Stripper
13 Cap
14 Sealing ring
15 Deflection shell
16 Lubricant channels
17 Outer deflection means
18 Inner deflection means
19 Transfer point
19a Through opening
20 Connection piece
21 Valve
22 Deflection shell
23 Cylindrical recess
24 Through opening
25 Transfer point
26 Sealing ring
27 Valve
28 Sealing section
29 Conical wall
30 Slot
31 Slot wall
32 Conical wall
33 Annular sealing section
34 Slot
35 Sealing ring
36 Wall
37 Valve
38
39 Sealing section
40 Valve opening

The invention claimed is:

1. A linear guide unit, comprising:
a guide carriage which is arranged on a guide rail having lubrication channels;
rolling bodies, which circulate in a plurality of endless circulatory channels, each of the circulatory channels has a load-bearing section, a return section and two deflection sections which connect the load-bearing section to the return section endlessly, the load-bearing section is delimited by raceways for the rolling bodies, the raceways are formed on the guide carriage and on the guide rail, the lubricant channels formed on the guide carriage are connected to the circulatory channels, and the lubricant channels have one end connected to a transfer point in order to guide lubricant from one of the lubricant channels via the transfer point to a another one of the lubricant channels or to the circulatory channel; and
a seal, which is arranged between the one end of the lubricant channels and the transfer point, having an annularly closed sealing section and a valve formed within the annularly closed sealing section, which prevents the lubricant channels from running dry, the seal being orientated such that no lubrication can escape the lubrication channels in a direction facing away from the guide carriage toward an outside environment.

2. The linear guide unit as claimed in claim 1, wherein the guide carriage has a supporting body and end pieces which adjoin end sides of the supporting body, the deflection sections being arranged in the end pieces, and each of the deflection sections having an inner deflection means and an outer deflection means, the rolling bodies being deflected between the inner deflection means and the outer deflection means, and the outer deflection means being formed on a deflection shell which is provided with the transfer point.

3. The linear guide unit as claimed in claim 1, wherein the transfer point has a tubular connection piece with a through opening for the lubricant, the seal being configured on the connection piece as a sealing ring, and the valve closing the through opening to prevent the lubricant channels from running dry.

4. The linear guide unit as claimed in claim 1, wherein the transfer point is a cylindrical recess in which the seal is arranged, and a through opening for the lubricant being formed centrally with respect to the cylindrical recess.

5. The linear guide unit as claimed in claim 1, wherein the seal, which is configured as a sealing ring, is formed from a material which is injection molded, the valve has a wall, which is planar or conical, being connected integrally to the annularly closed sealing section of the sealing ring.

6. The linear guide unit as claimed in claim 5, wherein an end of the conical wall, which faces away from a cone tip, merges into the annularly closed sealing section.

7. The linear guide unit as claimed in claim 6, wherein an inner side of the conical wall at the cone tip closes a valve opening elastically which opens elastically under pressure loading in the direction of the circulatory channel.

8. The linear guide unit as claimed in claim 5, wherein the planar or conical wall has a single slot or a plurality of slots arranged crosswise which penetrate the planar or conical wall, the single slot or the plurality of slots bearing elastically against one another and opening under pressure loading in a direction of the circulatory channels.

9. The linear guide unit as claimed in claim 8, wherein a crossing point of the plurality of slots which are arranged crosswise is aligned with the cone tip.

10. The linear guide unit as claimed in claim 8, wherein the single slot is produced on the planar or conical wall by cutting cut or punching, the planar or conical wall being produced using an injection molding process.

11. The linear guide unit as claimed in claim 8, wherein the single slot is produced on the planar or conical wall during injection molding in an injection molding die.

12. The linear guide unit as claimed in claim 1, wherein an elastomer or a thermoplastic polyester elastomer is used as material for the valve.

13. The linear guide unit as claimed in claim 1, wherein the annularly closed sealing section and the valve are formed as a single piece.

14. The linear guide unit as claimed in claim 1, wherein the seal is formed by a thermoplastic polyester elastomer.

* * * * *